United States Patent Office 3,311,990
Patented Apr. 4, 1967

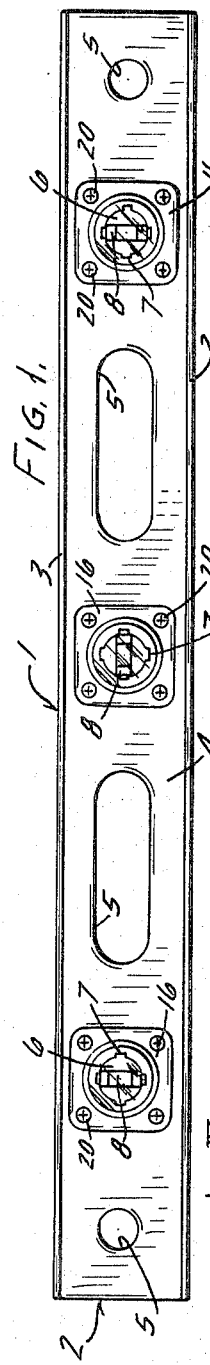
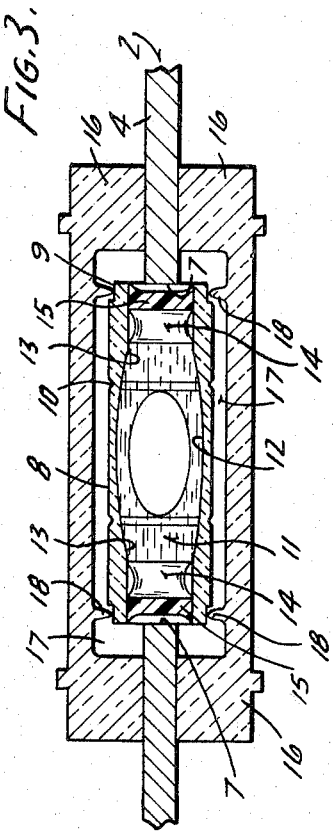
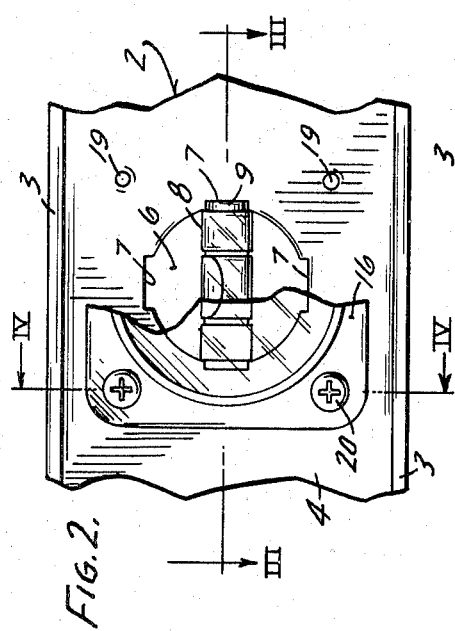
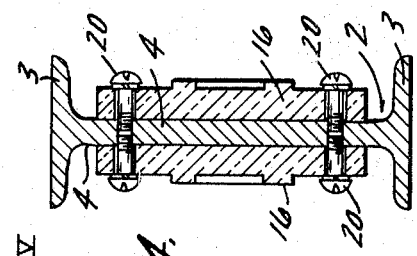
INVENTOR.
DONALD E. WRIGHT
BY
ATTORNEY.

3,311,990
LEVEL
Donald E. Wright, Box 387, Elm Grove, Wis. 53122
Filed June 25, 1964, Ser. No. 377,881
10 Claims. (Cl. 33—211)

This invention relates to a level instrument and more particularly to a vial construction for such an instrument.

The manufacture of level instruments presently requires relatively highly skilled labor in final production phases to precisely align the level and plumb vials thereof in relation to the working surfaces of the level frame. Precise vial alignment is accomplished as a separate operation at a substantial cost.

The vial alignment procedure usually involves the placement of the level frame upon an accurately established level or plumb test surface while a vial case containing a pair of arcuate vials is assembled on the frame. The vials, the ends of which are embedded in a soft hardenable cement, are then manually adjusted on the test surface until the bubbles contained therein register with indicators provided on the vial surfaces. The cement is permitted to harden somewhat before any adjusting operations are performed. Another procedure requiring skilled labor for precision adjustment entails the attachment of each of a pair of arcuate vials to a vial holder. The pair of vial containing holders are loosely assembled in an opening in the level frame. The assembly is then positioned upon a level or plumb test surface, and the loosely assembled holders are adjusted to obtain a predetermined bubble position. The holders are finally firmly secured to the frame with the vials in their adjusted positions. Examples of such methods can be found in the patents to H. J. Ziemann 2,750,678 and 2,810,206.

The present invention is aimed at a level and vial construction which will produce substantial reduction in the cost of manufacture of level instruments through a reduction in both material and labor requirements. Further, instruments produced in accordance with the invention will provide the user greater flexibility both in the ease of replacement of broken parts and in the simple method provided for converting the angular relationship of a vial in a particular cell with a working surface of the instrument.

Since the vial of the invention utilizes a generally barrel shaped bubble chamber, the customary grouping of vials in pairs in a level instrument is no longer required. Where two vials were previously found to be necessary, one vial will now suffice. This results in the realization of an appreciable reduction in the cost of manufacture of level instruments.

The level frame is fabricated with precision mounting means for engaging and retaining the vial. The vial itself is prepared for a precision fit in the mounting means of the frame. However, in spite of the fact that both the vial and frame are prepared for precision mounting, unskilled labor can readily accomplish the installation of the vial in the frame. The labor involved requires no adjustment of the vial to properly register the bubble of the vial with the indicator provided thereon. There is no requirement for an assembler to visually observe, judge and adjust the position of the vial to obtain a predetermined bubble alignment. The assembler merely inserts the vial into the mounting means provided on the frame of the instrument and secures cover plates on each side of the frame over the vial. These cover plates serve to automatically align the longitudinal axis of the vial in a plane normal to the working surfaces of the frame.

Due to the simplicity of vial installation, the owner of an instrument with damaged vials or cover plates may easily and conveniently replace them himself with the assurance that the repaired instrument will provide the same accuracy as a factory tested unit. He is, therefore, spared the inconvenience and loss of time ordinarily involved in returning the damaged instrument to the manufacturer for re-installation of a vial cell and the adjustment thereof.

Due to the method devised for installing the vial of the invention in the frame of a level instrument, the fabrication of precision vial bodies can be accomplished utilizing plastic materials and high speed mass production techniques with a resultant reduction in the cost of both materials and labor. Previous attempts in the use of plastics in the production of bubble cells for level instruments have been directed to high speed injection molding of cell halves. Unfortunately, it has proven difficult to economically join molded cell halves with an effective liquid seal and to produce a commercially valuable cell. The vial of the invention, however, is generally made from a tubular extrusion of a dimensionally stable plastic and thereby obviates the difficulties attendant in the use of molded sections.

The vial of the invention is ordinarily fabricated from an acrylic plastic tubular extrusion. The central portion of the interior of the tube is shaped to a generally barrel configuration; or more precisely, it assumes the general configuration of the middle frustum of a prolate spheroid. A pair of parallel annular grooves are cut into the external periphery of the vial and are spaced equidistantly from the midpoint of the barrel portion of the tube. These grooves serve as bubble alignment guides. Cylindrical end portions establish communication between the barrel shaped central portion and the exterior of the tube and provide cylindrical sealing regions at the ends of the tube. The exterior of the tube usually has machined annular recesses at each end which are precision formed for close fitting engagement with preformed precision slots in the frame of a level instrument. Spool shaped plugs are inserted into the cylindrical bore portions of the tube to seal fluid in the barrel shaped central portion of the tube. Each plug is designed to co-operate with the cylindrical bore to produce a pair of spaced essentially annular line seals. A dimensionally stable cement is applied to the exterior of the seal to provide a secondary seal.

After the vial has been inserted into the slots of a level frame, transparent cover plates are secured to the frame. These plates serve to protect the vial from damage, to facilitate reading of the instrument, and to align the longitudinal axis of the vial in a plane normal to the working surfaces of the frame.

Various other objects and advantages of the invention shall become more fully apparent from the following drawings and description which describe the best mode presently contemplated for carrying out the invention.

FIGURE 1 is a side elevation of a form of level and plumb determining instrument made in accordance with the invention;

FIGURE 2 is a fragmentary view with parts broken away of the central portion of the instrument shown in FIGURE 1;

FIGURE 3 is a longitudinal-sectional view taken on line III—III of the unit shown in FIGURE 2;

FIGURE 4 is a cross-sectional view taken on line IV—IV of the unit shown in FIGURE 2; and FIGURE 5 is an end view of the vial of the invention shown in FIGURES 1, 2 and 3.

The drawings, and particularly FIGURE 1, illustrate a level instrument 1 made in accordance with the invention. As can most clearly be seen in FIGURE 4, level instrument 1 is formed with a frame, generally designated 2. The frame 2 is usually metal and, in this instance, comprises an aluminum extrusion having a generally I-shaped cross-section. Top and bottom working surfaces 3 are precision machined and define parallel planes with respect to each other. These surfaces are connected by web section 4 of uniform cross-section throughout the length thereof which is positioned at right angles to working surfaces 3, and defines a longitudinally extending plane at right angles thereto.

Referring again to FIGURE 1, a number of openings 5, which may assume a variety of shapes, are formed in web 4 to lighten the frame and to facilitate manipulation and storage of the instrument. Three additional openings or vial receptacles 6 are provided in the embodiment shown in FIGURE 1.

As can be best viewed in FIGURE 2, the vial openings or receptacles 6 are formed with a plurality of diametrically opposed notches 7. These notches have the appearance of open ended rectangles. In manufacturing the level frame, the notched openings are generally made by a broaching technique. The notch defining surfaces lie at substantially right angles to the plane of web 4. Regardless of the method selected for producing the notched openings, the dimensions of the notches and the distance they are spaced apart must be maintained within relatively close tolerances and therefore require rather precise machining operations. This is necessary to produce the close fit required between the frame and a vial.

Generally, the notches 7 are formed in web 4, as is shown in FIGURE 2, with one pair positioned to receive and align the longitudinal axis of a level vial 8 in parallel relationship to working surfaces 3 and with another pair positioned to maintain the longitudinal axis of vial 8 in normal relationship to working surfaces 3. Other angular relationships between the vial and the working surfaces of frame 3 can be produced if required and such relationships are considered to be within the scope of the invention.

The vials 8, as shown in the drawings, are manufactured from a transparent material such as plastic or glass which is extruded in tubular form. The plastic generally used for vial production is an acrylic thermoplastic polymer. This material was selected in this instance for its high degree of transparency, dimensional stability and its workability in high speed mass production processes. Other materials with similar properties can be employed, however, in producing the vial of the invention.

FIGURES 3 and 5 best illustrate the presently preferred construction of vial 8. The outer periphery of the initially cylindrical plastic tube is precision machined at both ends to produce a pair of annular recesses 9 which are in concentric relation with the longitudinal axis of the vial and have substantially identical dimensions. Very close machining tolerances are desired in preparing the vial ends so that the vial can be easily slipped into notches 7 but only in a manner such that the vial is held between the notches and the longitudinal axis of the vial is registered in generally parallel relationship with the plane defined by the web portion of the frame.

While annular recesses have been selected to simplify the installation of vials in frames by requiring only alignment of the vials with the notches in the web and the insertion of vials between the notches at substantially right angles to the web, it may be desirable, in some instances, to provide vial ends with other than annular recesses. It may be determined that only a small portion of the external end peripheries of a vial will require recessing for a particular application, the degree and form of the recessing provided being related to the magnitude and configuration of the mounting means provided on the web. On occasions it may be found to be desirable to employ an entirely cylindrical vial which would be precision produced by extrusion or machining to register in secure engagement with the mounting means of the web.

As may be noted in FIGURE 3, a pair of spaced annular grooves 10 are cut into the external periphery of vial 8. These grooves define planes which are in parallel relation. They are accurately spaced equidistantly from the midpoint of the barrel shaped interior of the vial. The degree of spacing of the grooves 10 is determined by the size of the bubble to be produced in the vial. The bubble within the vial should register precisely between the grooves when a desired predetermined angularity has been obtained, as is shown in FIGURE 3.

With particular reference to FIGURES 3 and 5, it can be seen that the bore 11 of vial 8 has a generally barrel shaped central portion 12 which can best be described as assuming the configuration of the middle frustum of a prolate spheroid. Such a configuration is known for its flexibility in permitting the accurate reading of a level instrument even though the flat surface 3 of an instrument 1, as shown in the drawings, is not lying flush with the surface being gauged. Only the edge portion bordering one of the elongate surfaces must be placed in contact with the surface being gauged. The edge can have an almost infinite angular relationship with this surface and still provide accurate results. Due to the curvature of the vials in common use at present, accurate readings cannot be taken unless the web portion of an instrument lies in generally vertical relationship with the surface being gauged.

The central barrel shaped portion 12 of bore 11 communicates with the exterior of vial 8 through cylindrical bore portions 13 at the ends of the vial. These cylindrical bore portions 13 provide a means for hermetically sealing the vial ends once a suitable fluid has been introduced into the barrel shaped portion of the bore. The hermetic seal of the bore is produced by inserting a plug 14, which acts as a primary seal, into the bore 13, and then by sealing plug 14 within bore 13 with a resinous mass 15 which acts as a secondary seal.

The plug 14 is shown to have a spool shape with a pair of parallel surfaces aligned at substantially right angles to the longitudinal axis of bore 13. The portion of plug 14 located between the parallel surfaces is depressed to form an annular concavity. Plug 14 thereby produces a double generally annular line contact with the surfaces defining cylindrical bore portion 13. One surface of the plug therefore acts as a liquid or wet seal while the other surface acts in conjunction with the resinous mass 15 to produce a dry seal. The fluid and the resin are separated by an air space produced by the annular concavity formed between the sealing surfaces. Best results have been obtained when plugs 14 have been fabricated from a plastic material having a hardness of between 40 to 60 durometers and which are substantially impervious to hydrocarbons and other compounds contained in the fluid confined in their bores. Polyvinyl chloride has been found to be an acceptable material for vial plug production. Plugs having a lower durometer hardness would not generally be satisfactory as they would not be expected to retain their shape. Plugs with higher hardness durometers could be so unyielding when installed that they could craze the bore by mechanical stress to an extent that a fluid tight seal could not be obtained; and, in some instances, it could expand the bore and the tube to a degree which would detrimentally affect the precision mounting of a vial in a level instrument. The line seal should, therefore, be fluid tight but not to the extent that it shall craze or deform the vial.

In selecting the resin to be applied as the secondary seal 15, the epoxy resins have been found to be reliable. one of the most important determinations in selecting a resin system has been found to be its dimensional stability. Generally, resins which contain evaporative solvents cause the resins to shrink while curing. Such shrinkage can cause distortion of the bore adjacent to the plug which can eventually lead to fluid leakage from the vial. The secondary resin seal used also serves to impart a degree of rigidity to the vial portions extending longitudinally outward from the vial plugs.

After a suitable fluid has been introduced into the vial 8 and the ends thereof have been sealed, the vial ends are aligned with the pair of notches 7 of opening 6 into which the vial is to be inserted. The vial is then moved at essentially a right angle to the plane of web 4 and the surfaces defining the recesses thereof are brought into precision close-fitting engagement with the surfaces defining the notches 7 in the web. The disposition of vial 8 at this stage of assembly is such that the longitudinal axis of the bore is aligned in parallel relationship with the plane of the web although it may not be aligned precisely with the vertical median line of web 4. It should be noted that due to the close-fitting precision of the vial with the notches of the web, no adjustment is required to register the vial axis in parallel alignment with the plane of the web.

As is best observed in FIGURES 2, 3 and 4, a pair of transparent cover plates 16 are secured to opposite sides of web 4 and over vial 8. These plates serve the dual function of protecting the vial and of establishing the lateral alignment of the vial with respect to the web. FIGURES 2 and 3 show that the central portion of each of the cover plates 16 is provided with an annular chamber 17 which is positioned out of contact with vial 8 when attached to web 4. A pair of spaced lips 18 on each cover plate project a predetermined distance into the chamber and establish a generally continuous line contact with the peripheral vial surfaces defining recesses 9. The vial surfaces engaged by lips 18 are supported by the rigidity imparted to them by the resin seal in the bore. The extent of projection of lips 18 is determined with reference to the surface of plate 16.

When the cover plates 16 are aligned with the threaded openings 19 shown in FIGURE 2 and are firmly secured to web 4 by screws 20, only the lips 18 on the plates generally engage the surfaces of recesses 9 and co-operate to align the vial 8 in a manner such that its longitudinal axis is generally positioned in alignment with the lateral mid-line of the web. Equal portions of the vial, therefore, are normally disposed on each side of the web. This alignment procedure is accomplished without reference to calibrated devices or test apparatus and is the automatic result of securing the cover plates 16 to the web 4.

Since no calibration is required in assembling vials in level instruments, manufacture of such instruments can be speeded up, and the skill and training required of assembly personnel can be minimized. Also, field replacement and repair of the vials of level instruments can ordinarily be accomplished without delay by the average artisan.

Various modes of carrying out the invention are contemplated as being within the scope of the following claims which particularly point out and distinctly claim the subject matter regarded as the invention.

I claim:

1. A level comprising a frame having a working surface, the frame being provided with an opening for receipt of a level vial, means on the frame bordering the opening and disposed in a predetermined fixed angular relationship with the working surface for engaging and retaining the level vial and for positioning the vial at a predetermined angle with respect to the working surface of the frame without further angular adjustment with respect to the working surface, and a level vial having a symmetrical generally barrel shaped bore disposed in concentric relation with the longitudinal axis of the vial, the outer surface of the vial being in a predetermined registry with respect to the longitudinal axis of the vial, the outer surface of the vial being positioned in close-fitting engagement with the engaging and retaining means on the frame bordering the opening provided therein to produce a vial installation without further angular adjustment of the vial with respect to the working surface of the frame.

2. The level of claim 1 wherein the portions of the level vial engageable with the engaging and retaining means on the frame are concentrically aligned with respect to the longitudinal axis of the barrel-shaped bore of the vial to facilitate vial installation on the frame substantially without further angular adjustment of the vial in relation to the working surface of the frame.

3. The level of claim 1 wherein the level vial is formed with a cylindrical configuration and the outer surface of the cylinder is concentrically aligned with respect to the longitudinal axis of the barrel-shaped bore of the vial to facilitate mounting of the vial on the frame substantially without further angular attachment.

4. The level of claim 1 wherein the engaging means provided on the frame portion bordering the opening provided in the frame are positioned in a manner permitting introduction of the level vial into the opening and into close fitting engagement with the engaging means in a direction substantially normal to the plane of the frame.

5. The level of claim 1 wherein the frame has parallel working surfaces connected by a web aligned in substantially normal relationship with the planes of the working surfaces, an opening is provided in the web for receipt of the level vial, vial engaging apertures are formed in the web portion bordering the opening for engaging and retaining the level vial in a predetermined angular position with respect to the parallel working surfaces of the frame, the engaging apertures being disposed in opposed relationship across the opening and being aligned in a straight line with respect to each other, the level vial being positioned in close fitting engagement with the surfaces defining the engaging apertures in the web, the level vial and the engaging and retaining apertures of the web being arranged on the frame to permit the connection, alignment and removal of the level vial at generally right angles to the plane defined by the web, and aligning means removably connectable to the web and engageable with the level vial when connected to the web to align the longitudinal axis of the level vial with the plane of the web.

6. The level of claim 5 wherein a plurality of level vials are mounted in the web of the frame in predetermined angular relationships with respect to the parallel working surfaces of the level and the level vials are interchangeable, one with another.

7. The level of claim 5 wherein the level vial aligning means comprises a pair of transparent vial holders, the vial holders being positioned on opposite sides of the web, each vial holder having elements disposed in engagement with a portion of the outer vial surface at each end thereof and on opposite sides of the web to establish a predetermined relationship between the longitudinal axis of the vial and the plane of the web, and means for maintaining the predetermined relationship of the level vial, vial holders and web.

8. The level of claim 7 wherein the elements on the vial holders disposed in engagement with a portion of the surfaces at each end of the vial act to establish line contacts therewith.

9. A level vial comprising a body having a cylindrical outer surface, the body being formed with a bore having a longitudinal axis and adapted to contain and confine a fluid, the central portion of the bore being located midway between the ends of the body and defining along the longitudinal axis thereof, substantially the middle frustum of a prolate spheroid, a generally cylindrical bore portion formed at each end of the central portion and establishing communication between the body exterior and the central portion of the bore to facilitate the rapid and bore, the cylindrical bore portions being disposed in generally concentric relationship with the longitudinal axis of the central portion and having diameters equal to that of the smallest diameter of the central portion, the outer cylindrical surface of the body being disposed in precise concentric relation with the longitudinal axis of the central portion of the bore to facilitate the rapid and accurate mounting of the vial upon a level frame substantially without adjustment, annular indicia formed in the body of the vial spaced equidistantly from the midpoint of the central bore portion whereby a bubble provided within the vial will register accurately between the lines defined by the indicia when the level vial is made to assume a predetermined angular position, one of the cylindrical bore portions serving to permit introduction of a fluid into the bore upon sealing of the other cylindrical bore portion against fluid loss, a fluid partially filling the bore, means hermetically sealing both cylindrical bore portions against fluid loss from the central bore portion, and a bubble within the vial produced by the partial filling and hermetic sealing of the bore for registering angular displacement of the vial in the relation to the annular indicia on the body.

10. The level vial of claim 9 wherein the means for hermetically sealing the cylindrical bore portions comprises a primary sealing means and a secondary sealing means for sealing the primary sealing means in the bore.

References Cited by the Examiner
UNITED STATES PATENTS

| | | | |
|---|---|---|---|
| 73,439 | 1/1868 | Copeland | 138—89 |
| 777,641 | 12/1904 | Knighton | 33—212 |
| 798,031 | 8/1905 | Gherky | 138—91 |
| 941,538 | 11/1909 | Schies | 215—80 |
| 1,488,419 | 3/1924 | Ward | 33—211 |
| 1,948,612 | 2/1934 | Bouchard | 33—212.2 X |
| 2,178,686 | 11/1939 | Georgiev et al. | 215—80 |
| 2,576,202 | 11/1951 | Wullschleger | 33—211 |
| 2,752,693 | 7/1956 | Wullschleger | 33—211 |
| 2,810,206 | 10/1957 | Ziemann | 33—211 |

LEONARD FORMAN, *Primary Examiner.*

L. ANDERSON, *Assistant Examiner.*

UNITED STATES PATENT OFFICE
CERTIFICATE OF CORRECTION

Patent No. 3,311,990                                 April 4, 1967

Donald E. Wright

It is hereby certified that error appears in the above numbered patent requiring correction and that the said Letters Patent should read as corrected below.

Column 6, line 66, strike out "portion of the bore to facilitate the rapid and" and insert instead -- bore portion along the longitudinal axis of the --.

Signed and sealed this 28th day of November 1967.

(SEAL)
Attest:

Edward M. Fletcher, Jr.                           EDWARD J. BRENNER
Attesting Officer                                     Commissioner of Patents